(12) United States Patent
Cunningham et al.

(10) Patent No.: US 6,626,073 B1
(45) Date of Patent: Sep. 30, 2003

(54) ON CAR BRAKE LATHE ALIGNING APPARATUS

(75) Inventors: Charles L. Cunningham, Nashville, TN (US); David M. Carpenter, Brentwood, TN (US)

(73) Assignee: Hennessy Industries, Inc., LaVergne, TN (US)

(*) Notice: Subject to any disclaimer, the term of this patent is extended or adjusted under 35 U.S.C. 154(b) by 0 days.

(21) Appl. No.: 09/611,535

(22) Filed: Jul. 7, 2000

Related U.S. Application Data

(60) Provisional application No. 60/142,855, filed on Jul. 7, 1999.

(51) Int. Cl.⁷ .................................................. B23B 5/04
(52) U.S. Cl. ............................. 82/112; 82/128; 82/151
(58) Field of Search ........................... 82/112, 113, 117, 82/128, 133, 134, 71, 76, 80, 151, 152, 163, 170, 903; 700/192, 193

(56) References Cited

U.S. PATENT DOCUMENTS

| | | | |
|---|---|---|---|
| 1,236,748 A | | 8/1917 | Osberg et al. |
| 1,554,302 A | | 9/1925 | Slyder et al. |
| 1,733,578 A | | 10/1929 | Burke |
| 1,904,152 A | | 4/1933 | Lovely |
| 2,546,225 A | | 3/1951 | Julian et al. |
| 3,303,709 A | | 2/1967 | Slisz et al. |
| 3,373,622 A | | 3/1968 | Stautmeister |
| 3,540,164 A | | 11/1970 | Deceuster |
| 3,540,165 A | | 11/1970 | Lanham |
| 3,603,158 A | | 9/1971 | Schlitz |
| 3,663,795 A | | 5/1972 | Myer |
| 3,689,161 A | | 9/1972 | Lill et al. |
| 3,691,880 A | | 9/1972 | Ratteree et al. |
| 3,895,539 A | | 7/1975 | Weman et al. |
| 3,951,563 A | | 4/1976 | Ravenhall |
| 4,165,662 A | * | 8/1979 | Besenbruch et al. ......... 82/112 |
| 4,180,915 A | | 1/1980 | Lill et al. |

(List continued on next page.)

FOREIGN PATENT DOCUMENTS

| | | | |
|---|---|---|---|
| DE | 1650731 | | 2/1974 |
| DE | 2835258 | | 2/1980 |
| DE | 3713744 A1 | * | 11/1988 |
| DE | 3842704 | | 4/1990 |
| DE | 4010180 | | 10/1991 |
| DE | 4107471 | | 9/1992 |
| DE | 4243087 | | 6/1993 |
| DE | 4330811 | | 9/1993 |
| DE | 4403951 | | 8/1995 |
| JP | 5882602 | | 5/1983 |
| JP | 117001 | | 6/1986 |
| JP | 1168841 | | 7/1989 |
| JP | 5273090 | | 10/1993 |
| JP | 7246501 | | 9/1995 |
| WO | 9809754 | | 3/1998 |
| WO | 9810262 | | 3/1998 |
| WO | 0025962 | | 5/2000 |

OTHER PUBLICATIONS

Paper entitled "Development of Precise Rotating Mechanism with Fine Motion Stage," Proceedings of Ninth World Congress of the Theory of Machines and Mechanisms held in Politecnico di Milano, Italy, Aug. 29 through Sep. 2, 1995.

*Primary Examiner*—Henry W. H. Tsai
(74) *Attorney, Agent, or Firm*—Nelson Mullins Riley & Scarborough

(57) ABSTRACT

A brake lathe alignment system is provided for mounting a brake lathe upon an adapter attached to a wheel hub. A first structure is adapted to be attached to the wheel hub. A second structure is adapted to be attached to the brake lathe. A plurality of hydraulic pistons are carried by the second structure and engage the first structure, so that alignment of the second structure relative to the first structure is adjustable by extending and retracting the hydraulic pistons. The adjustment of position of the hydraulic pistons can be manually controlled on-the-fly by operation of manually actuated hydraulic pumps.

6 Claims, 9 Drawing Sheets

U.S. PATENT DOCUMENTS

| | | |
|---|---|---|
| 4,226,146 A | 10/1980 | Ekman |
| 4,336,730 A | 6/1982 | Kopecko et al. |
| 4,388,846 A | 6/1983 | Kopecko et al. |
| 4,452,111 A | 6/1984 | Anderson |
| 4,478,116 A | 10/1984 | Fuller |
| 4,493,231 A | 1/1985 | Wossner |
| 4,523,499 A | 6/1985 | Aldridge, Jr. |
| 4,640,158 A | 2/1987 | Link et al. |
| 4,678,408 A | 7/1987 | Nason et al. |
| 4,703,977 A | 11/1987 | Haanschoten |
| 4,745,469 A | 5/1988 | Waldecker et al. |
| 4,759,243 A | 7/1988 | Thompson |
| 4,764,760 A | 8/1988 | Bedard et al. |
| 4,831,365 A | 5/1989 | Thomas et al. |
| 4,853,680 A | 8/1989 | Thomas |
| 4,854,199 A | 8/1989 | Norman |
| RE33,144 E | 1/1990 | Hunter et al. |
| 4,953,296 A | 9/1990 | Spainhour |
| 5,054,918 A | 10/1991 | Downing et al. |
| 5,099,728 A | 3/1992 | Thiem |
| 5,103,595 A | 4/1992 | Dale et al. |
| 5,187,669 A | 2/1993 | Wildes et al. |
| 5,201,586 A | 4/1993 | Zimmermann et al. |
| 5,279,192 A | 1/1994 | Hartman |
| 5,347,895 A | 9/1994 | Bellinghausen et al. |
| 5,499,563 A | 3/1996 | Hansen |
| 5,544,872 A * | 8/1996 | Schuit .................. 269/26 |
| 5,549,023 A | 8/1996 | Strout et al. |
| 5,602,733 A | 2/1997 | Rogers et al. |
| 5,615,589 A | 4/1997 | Roach |
| 5,645,465 A | 7/1997 | Vannan, III |
| 5,653,153 A | 8/1997 | Greenwald |
| 5,760,938 A | 6/1998 | Hodge |
| 5,765,457 A | 6/1998 | Meyer et al. |
| 5,967,208 A * | 10/1999 | Calvert .................. 144/356 |
| 5,970,427 A | 10/1999 | Greenwald |
| 5,974,878 A | 11/1999 | Newell et al. |
| 6,044,310 A * | 3/2000 | Douglass ................ 700/192 |
| 6,050,160 A | 4/2000 | Newell et al. |
| 6,101,911 A | 8/2000 | Newell et al. |
| 6,116,844 A * | 9/2000 | Hayward ................ 414/680 |

* cited by examiner

ON CAR BRAKE LATHE ALIGNING APPARATUS

Be it known that we, Charles L. Cunningham, a citizen of the United States, residing in Nashville, Tenn. and David M. Carpenter, a citizen of the United States, residing in Brentwood, Tenn.; have invented a new and useful "On Car Brake Lathe Aligning Apparatus."

This application claims benefit of Provisional U.S. Patent Application Serial No. 60/142,855 filed Jul. 7, 1999, entitled "On Car Brake Lathe Alignment Adjustment Device."

BACKGROUND OF THE INVENTION

1. Field of the Invention

The present invention relates generally to apparatus for machining the brake rotors on a vehicle, and more particularly, but not by way of limitation, to such an apparatus which provides "on-the-fly" alignment of the brake lathe with the centerline of the spindle on which the wheel hub and the brake rotor are mounted, whereas to provide rapid and easily operated brake machining operations.

2. Description of the Prior Art

Traditionally, brake lathes have required a series of steps to align the lathe with the spindle so as to cut the brake rotor perpendicular to the axis of rotation of the rotor. Such previous systems typically involved misalignment measurement while rotating the rotor, followed by stopping the rotor to adjust the alignment, then again measuring misalignment with the rotor rotating, and repeating the process in a trial and error fashion until a satisfactory alignment was obtained. An example of such a device is shown in U.S. Pat. No. 5,653,153 to Greenwald.

More recently, there have been introduced fully automated brake lathe machines, such as shown for example in U.S. Pat. No. 5,974,878 to Newell et al. and U.S. Pat. No. 6,050,160 to Newell et al. Devices like those of Newell et al. suffer from a number of shortcomings. First, the automatic adjustment mechanisms are highly complex and expensive. Second, even though the adjustment mechanism is fully automated, it adjusts in an incremental fashion with each rotation of the rotor and thus, can take a relatively long time (e.g. 45 to 60 seconds) to achieve its optimum alignment in cases of severe misalignment.

Thus, there is a continuing need for further improvements in the design of wheel hub mounted brake lathes.

SUMMARY OF THE INVENTION

The present invention provides a brake lathe alignment apparatus for mounting a brake lathe upon a wheel hub. The apparatus includes a face plate adapted to engage the adapter for defining an alignment of the wheel hub and the adapter. A compensator head is mounted upon the brake lathe body for defining an alignment of the brake lathe body. An adjustable three-point support system is provided between the face plate and the compensator head, with at least two of the three points being adjustable, so that the alignment of the brake lathe body relative to the wheel hub and the adapter can be adjusted.

The three-point support system is preferably provided by one fixed support point and two hydraulic pistons extending from the compensator head and engaging the face plate to define the two adjustable points of the three-point support system. Each hydraulic piston has an individually operable manually actuated hydraulic pump associated therewith.

Thus, while the wheel hub and brake rotor are being driven by the brake lathe, an on-the-fly alignment adjustment is possible by manually operating the hydraulic pumps to adjust the position of the two hydraulic support pistons, thus adjusting the alignment of the brake lathe relative to the spindle centerline and the disc brake rotor.

It is therefore an object of the present invention to provide improved methods and apparatus for alignment of a wheel hub mounted brake lathe with a disc brake rotor.

Another object of the present invention is to provide an "on-the-fly" manual adjustment of alignment of a brake lathe.

Another object of the present invention is the provision of a three-point support system between a wheel hub and a brake lathe.

Still another object of the present invention is the provision of a hydraulically operated alignment adjustment system between a wheel hub and a brake lathe.

Another object of the present invention is the provision of more rapid methods for the alignment of a brake lathe with a wheel hub and disc brake rotor.

And another object of the present invention is the provision an "on-the-fly" adjustable brake lathe alignment apparatus which is more easily operated and more economically constructed than other currently available apparatus.

Other and further objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS EMBODIMENT OF FIGS. 1 AND 2

Figure 1:
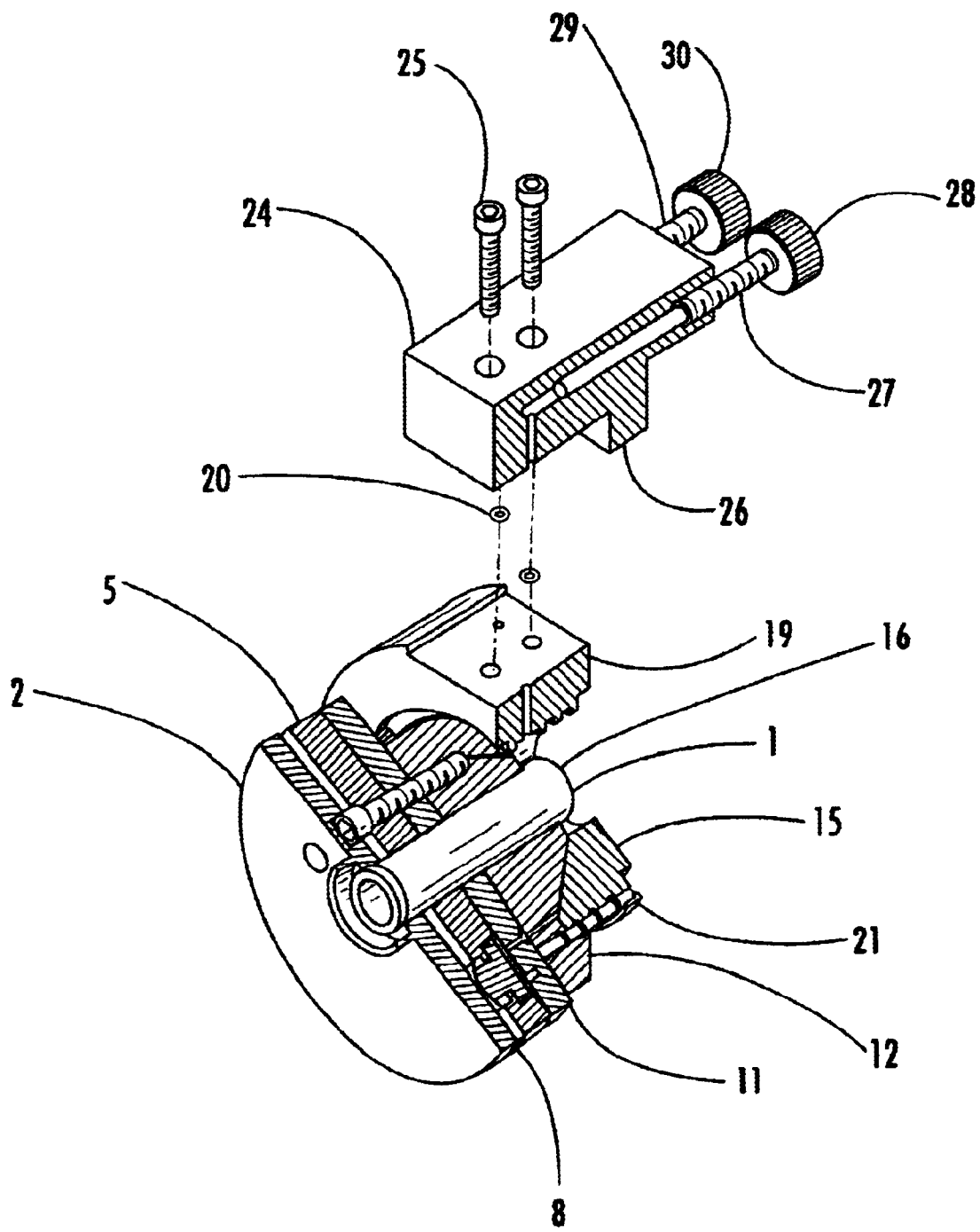
FIG. 1 is a perspective, partially cut away, partially exploded view of a first embodiment of the alignment adjustment apparatus.

The alignment adjustment device of the present invention is designed to attach to the spindle hub of the wheel of a vehicle and enable a brake lathe to be axially aligned with the spindle hub axis of rotation so that the brake rotor can be machined perpendicular to that axis. The device is attached to the vehicle wheel hub through the use of an adapter. The adapter is connected to the lug nuts of the vehicle wheel hub and is designed to receive a threaded draw bar. The draw bar passes through the brake lathe, the alignment compensating device and screws into a female threaded portion of the adapter attached to the vehicle wheel hub. The draw bar has a plate on its end opposite the threaded end and the plate is pulled against the brake lathe to hold the lathe in fixed relationship to the vehicle wheel hub. This draw bar has a spring to compensate for length changes as the alignment device changes in assembled length as the alignment is completed. As can be seen from FIG. 1, the device has a retaining hub 16 which the draw bar passes through.

As is customary in the art, the brake lathe rotates the spindle in order to turn the brake disc which is attached to the axle of the vehicle. The lathe typically has a leg supporting the device on the floor of the garage to prevent rotation of the lathe itself The cutting heads of the lathe then engage both sides of the disc and are moved by the lathe radially outwardly from the center of the disc to the perimeter of the disc to refinish the surface of the disc in a perfect (or near-perfect) plane. Since the brake disc theoretically lies in a plane perpendicular to the axis of the vehicle wheel hub, to properly finish the surface of the disc, the cutting heads of the lathe must move exactly in the plane described. This requires that the axis of the lathe be perfectly aligned with the axis of rotation of the vehicle wheel hub. When the lathe is attached to the hub, perfect alignment is not achieved without adjustment because the connection of the lathe to the hub is dependent upon the tightening of the lug nuts that attach the lathe to the hub and the perpendicularity of the lug face and adapter face. The alignment compensation device of the present invention allows all alignment compensation to be performed while the lathe is turning the vehicle wheel hub.

Using the adapter assembly of the present invention, the actual run out (or angle of axis variance) between the axis of the vehicle wheel hub and the axis of the brake lathe is corrected by moving the pivot plate 2 of the adapter on a three point contact system. One of the three contact points of the pivot plate is fixed. The fixed pivot point is housed in the piston house 5 and rests against the distribution plate 11 for pivotal motion only while the other two contact points can be raised and lowered relative to the fixed pivot point (the stationary pivot boss 9) independently by hydraulic fluid transfer. Thus, as the two other contact points are raised and lowered, the angle of the axis of the brake lathe can be aligned substantially exactly with the axis of the vehicle hub so that the finishing of the brake disc can be performed in a plane that is exactly perpendicular to those axes.

The adjustment of the two moveable contact points is achieved through pistons 7 and 8. The present invention employs hydraulic fluid pressure to raise or lower the two moving pistons. The hydraulic fluid pressure is increased or decreased by turning control knobs 28 and 30. The control knobs 28 and 30 are attached respectively to their own pistons 8 and 7. Thus, turning control knob 28 controls the moving of piston 8 while turning control knob 30 controls the movement of piston 7. As piston 7 and 8 are moved in one direction or the other (in FIG. 2, the pistons are aligned so that they move to and fro in response to adjustments of knobs 28 and 30), in response to the increased or decreased hydraulic fluid pressure, the angle of the pivot plate 2 is changed.

Each control knob controls only a single piston. This allows independent control of each hydraulic circuit and the associated relative piston movement. The two hydraulic circuits operate identically. The following description is of the one circuit controlled by control knob 28 and its commensurate control of piston 8. When knob 28 is rotated, it in turn rotates the threaded plunger 27 which pushes hydraulic fluid through the fluid vein in the pump manifold 24. Oil is ported from the pump manifold 24 to its respective port or vein in the female half of the rotary coupling 19. There are O rings in this half of the rotary coupling to isolate the oil fluid from control knob 28 to port 12 in the rotary coupling male half 15. Oil from port 12 is transferred to piston 8 through the distribution plate 11. In response to the turning of the knob 8 in a clockwise direction, the piston 8 will advance thus, pushing the plate 2 away from the hub thereby changing the angle of axis of the brake lathe relative to the axis of the hub of the vehicle wheel. If rotating the control knob 28 clockwise causes an increased deviation from alignment, the operator will rotate the knob in the opposite direction.

The deviation from alignment can be detected in a variety of ways. One way is to use a gauge that can be attached to the brake lathe. The gauge has a sensor arm that is attached to an adjacent stationary body and as the sensor arm moves to and fro, the amplitude of movement either increases or decreases depending upon whether the control knob is turned in the proper direction. If the control knob is being turned in the proper direction, the operator continues to turn the control knob until the amplification of the difference in alignment begins to increase as which point the control knob is turned in the reverse direction to a point where the deviation is minimized. The second control knob 30 is then adjusted in the same fashion until such time as there is no deviation in the alignment of the axes of the brake lathe and the axis of the hub of the vehicle. The two knobs can be adjusted simultaneously to increase both the speed with which the alignment is achieved and the accuracy of the alignment.

EMBODIMENT OF FIGS. 3–7

Figure 3:
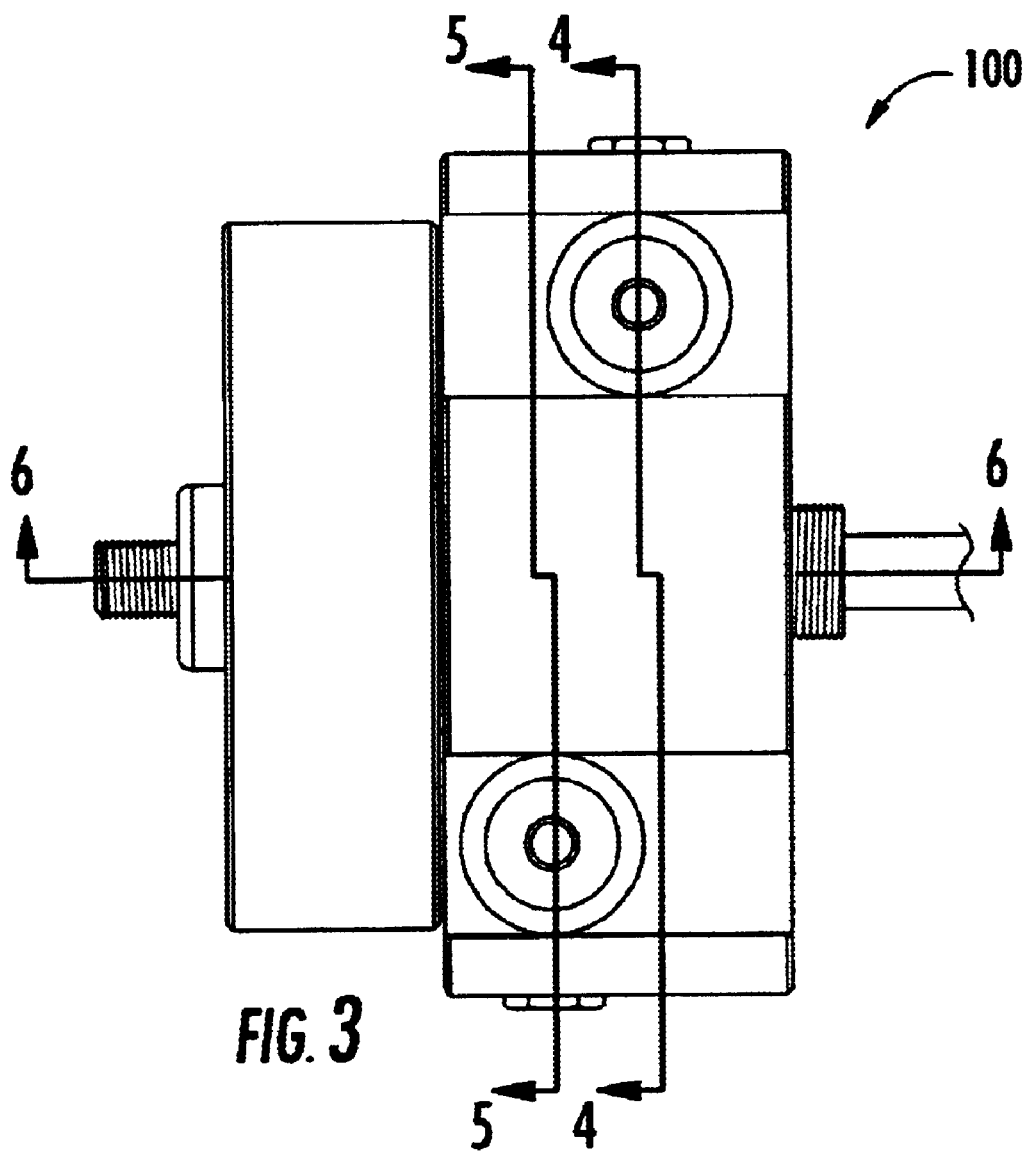
FIG. 3 is a side elevation view of a second embodiment of the alignment apparatus of the present invention.
Figure 4:
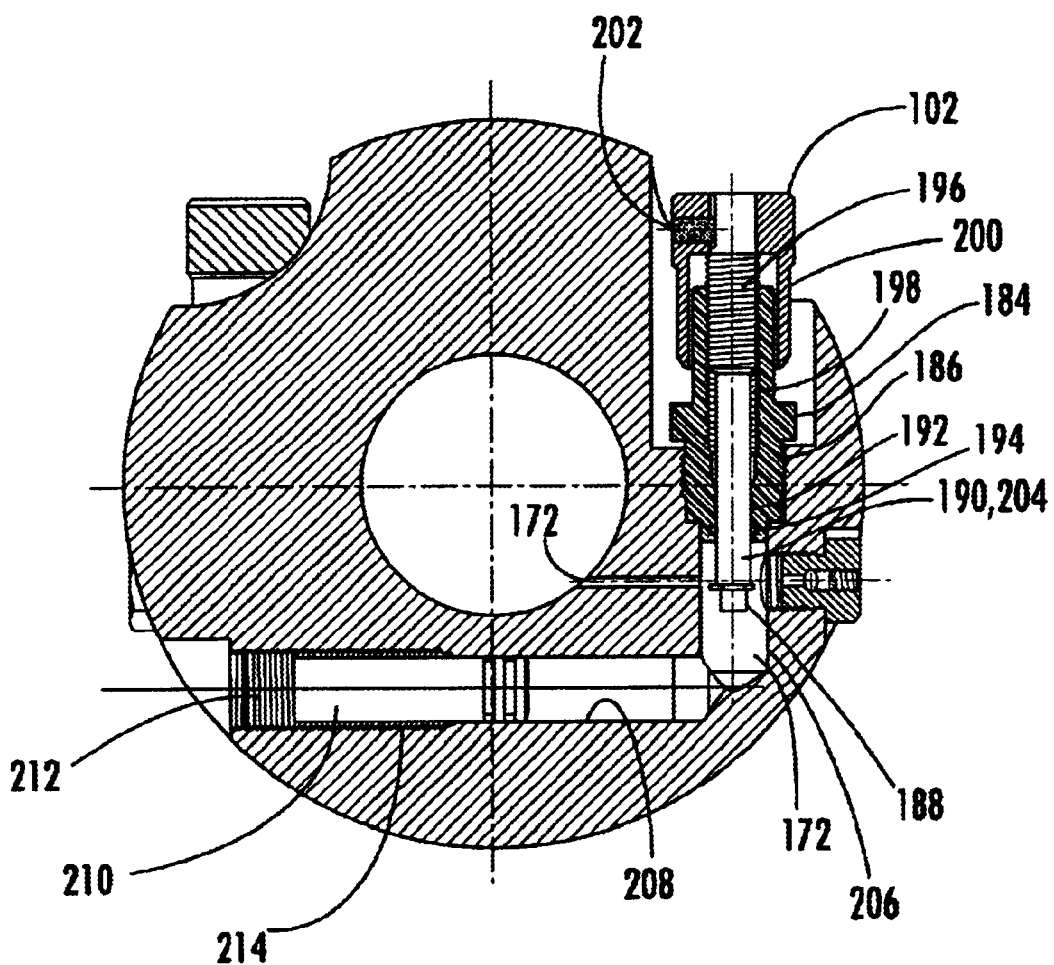
FIG. 4 is a sectioned view taken along line 4—4 of FIG. 3.
Figure 5:
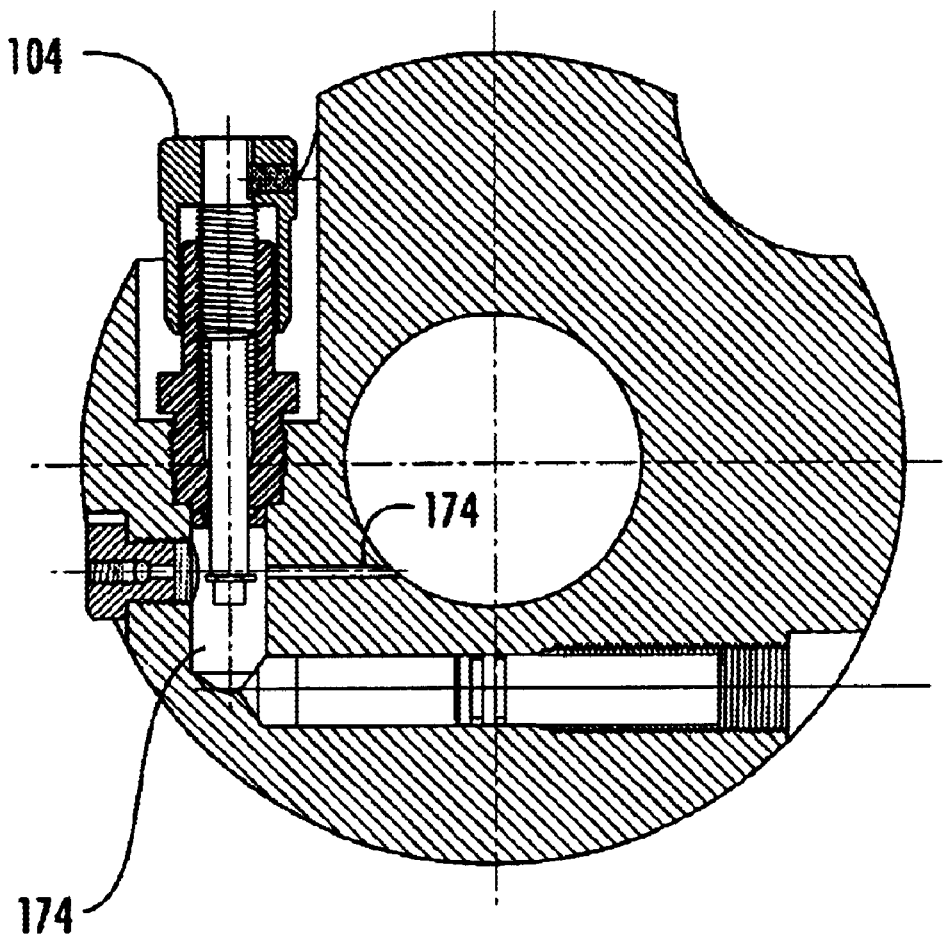
FIG. 5 is a sectioned view taken along line 5—5 of FIG. 3.
Figure 6:
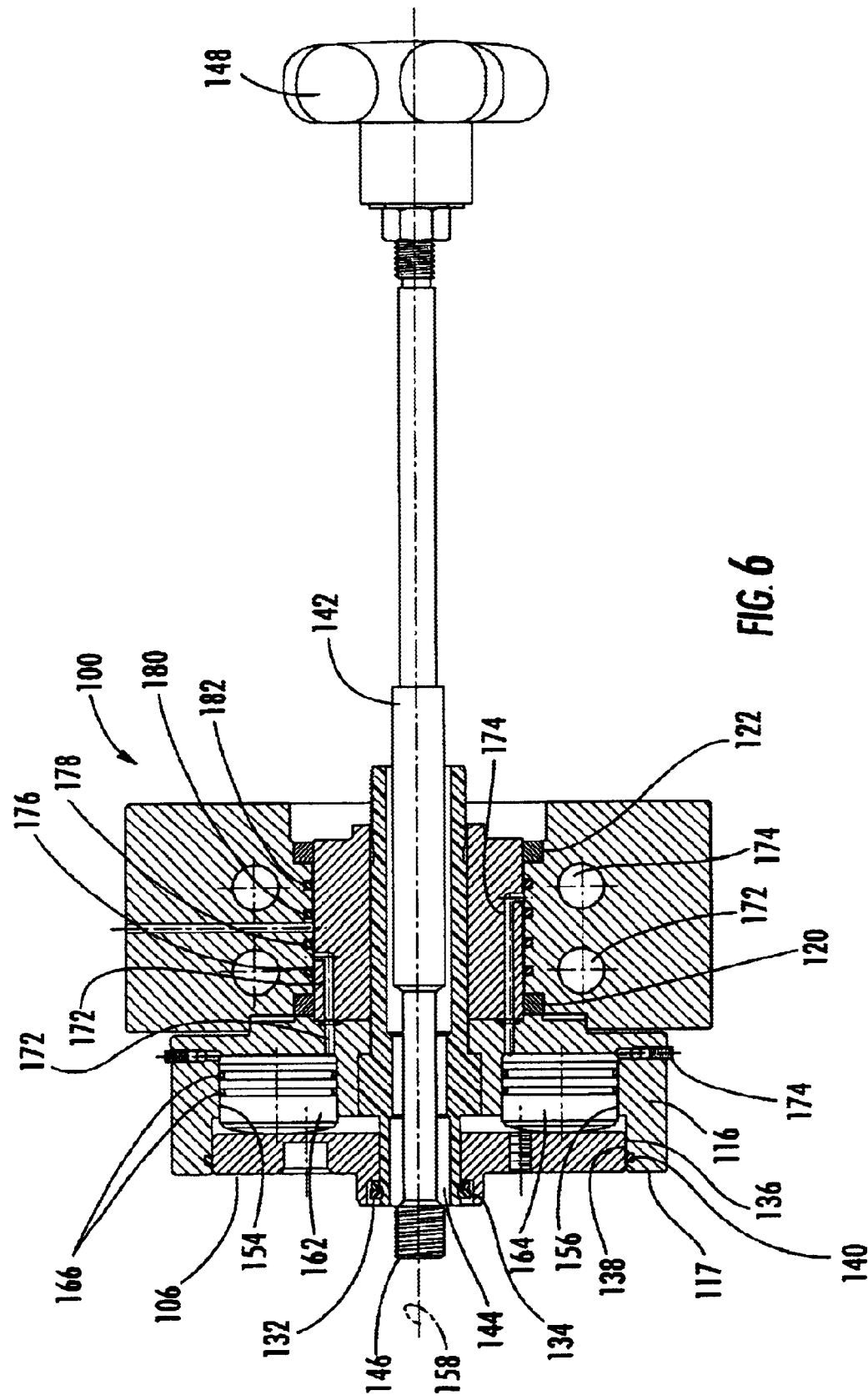
FIG. 6 is a sectioned view taken along line 6—6 of FIG. 3.
Figure 7:
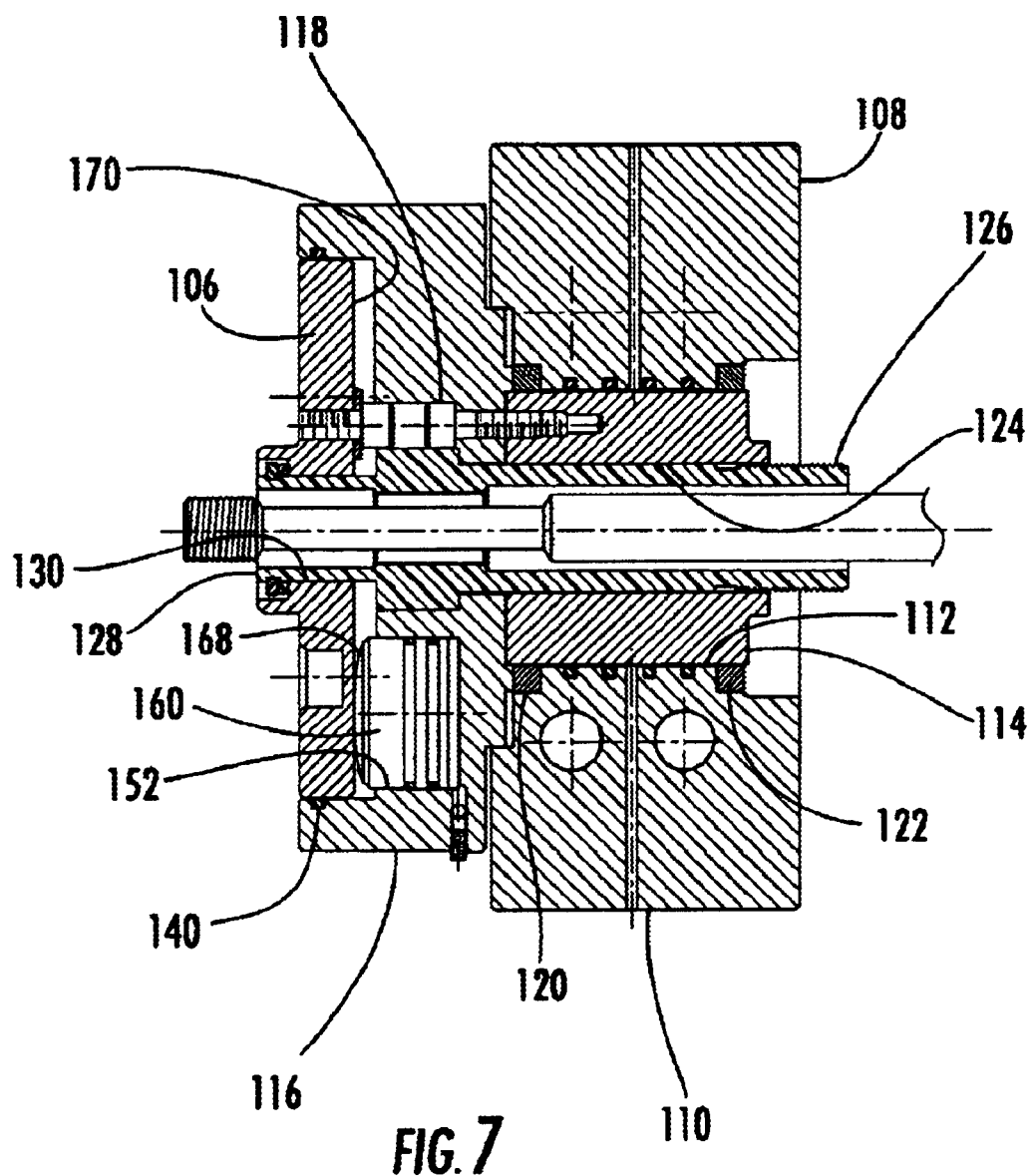
FIG. 7 is a view similar to FIG. 3 having a portion of the compensator head rotated to show in cross section certain other portions of the apparatus.

In FIG. 3, a side elevation view is thereshown of a modified embodiment of the brake lathe alignment apparatus of the present invention which is generally designated by the numeral 100. FIGS. 4 and 5 are cross-sectional views illustrating the construction of the two hydraulic pumps 102 and 104. FIGS. 6 and 7 are axial cross-sectional views showing the manner of construction of the alignment apparatus 100.

The apparatus 100 includes a face plate 106 adapted to engage an adapter 101 connected to a wheel hub 103 (see FIG. 9) for defining an alignment of the wheel hub 103, brake rotor 105 and the adapter. Apparatus 100 further includes a coupling head assembly 108 mounted upon the brake lathe body 109 (see FIG. 9) for defining an alignment of the brake lathe body 109. The hub 103, brake rotor 105 and adapter 101 are shown in dashed lines in FIG. 9.

The coupling head assembly 108 includes main coupling head 110 which has a bore 112 within which is rotatably received a compensator stub shaft 114. The compensator stub shaft 114 is attached to a main compensating head 116 by a plurality of threaded cap screws 118. First and second bearing bushings 120 and 122 are provided between the main coupling head 110 and the compensator stub shaft 114.

Compensator stub shaft 114 has a bore 124 within which is received a mounting sleeve 126.

The mounting sleeve 126 has a reduced diameter distal end portion 128 about which a bore 130 of face plate 106 is received. A retainer ring 132 is received by distal portion 128 of mounting sleeve 126, and an O-ring seal 134 is located between the retainer ring 132 and the face plate 106.

Face plate 106 includes a cylindrical outer surface 136 closely received within a bore 138 of main compensating head 116 with an O-ring seal 140 provided therebetween.

Figure 9:
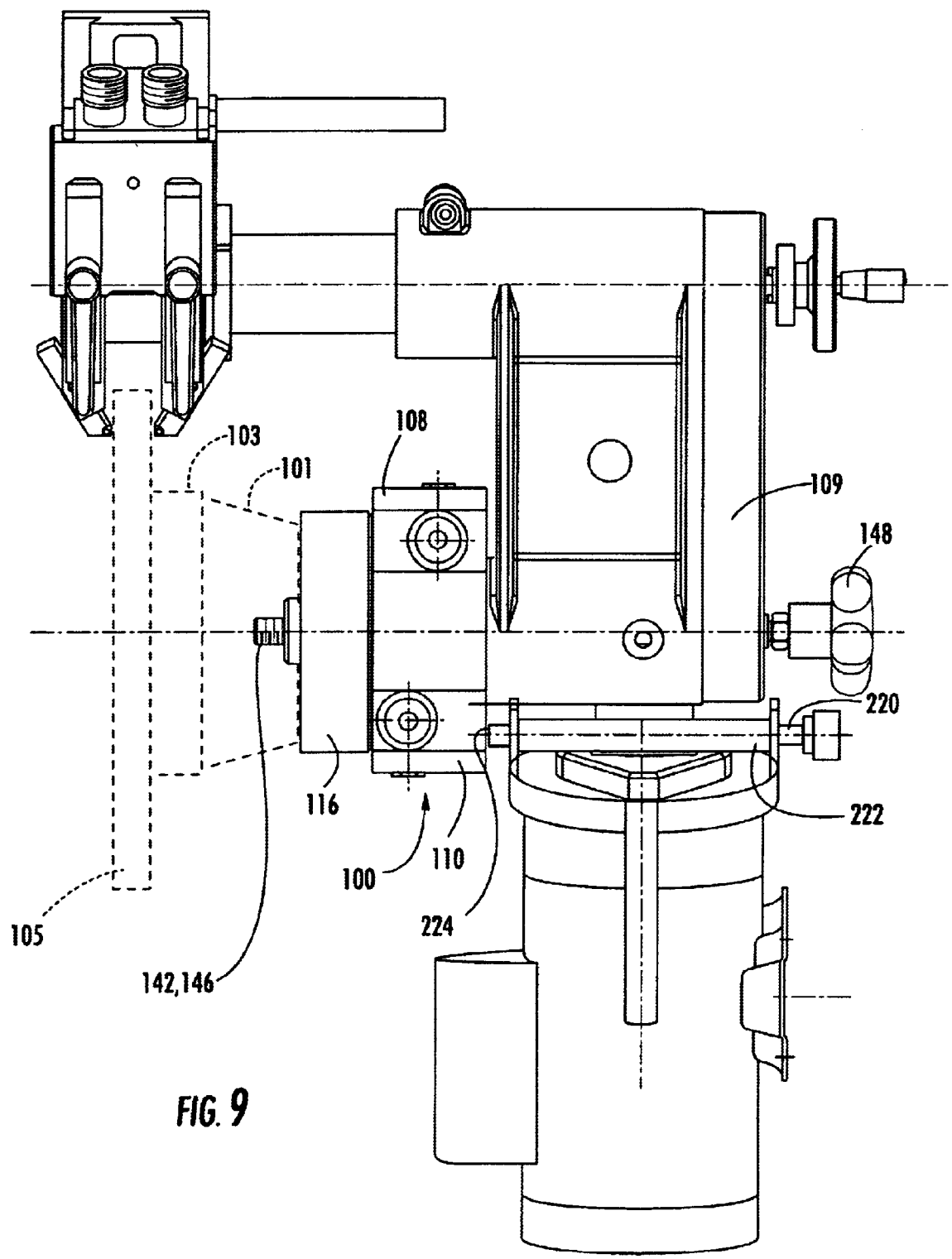
FIG. 9 is a an assembly view showing the brake lathe connected to a wheel hub adapter.

A draw bar 142 extends through an inner bore 144 of mounting sleeve 126. Draw bar 142 has a threaded distal end portion 146 which is threadedly connected to the adapter of the wheel hub as shown in FIG. 9. A knob 148 is attached to the proximal end of draw bar 142.

Figure 8:
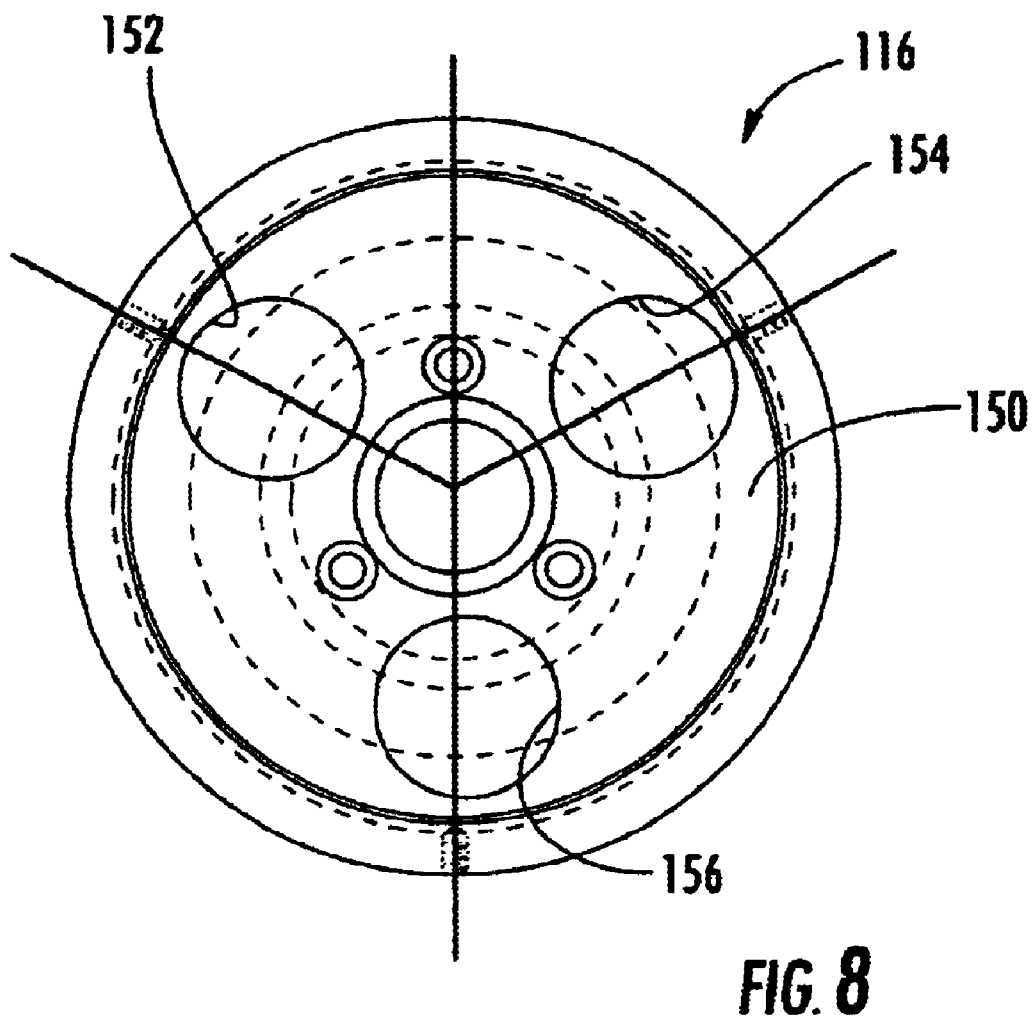
FIG. 8 is an end elevation view of the compensator head showing the bores within which the three support pistons are received.

FIG. 8 is a front end elevation view of the main compensating head 116. Compensating head 116 has a forward face 150 which has three blind bores 152, 154 and 156 defined therein.

Cross-sectional details of the bores 152, 154 and 156 can be seen in FIGS. 6 and 7. It will be appreciated that the angular positions of the bores about the longitudinal axis 158 of the apparatus 100 have been rotated in FIGS. 6 and 7 to allow each of the bores 152, 154 and 156 to be shown in full cross-section. The bores 152, 154 and 156 are preferably located at angles of 120° apart about the axis 158 as is shown in the front elevation view of FIG. 8.

A fixed first piston 160 is received in first bore 152 as shown in FIG. 7. Movable second and third pistons 162 and 164 are received in second and third bores 154 and 156 as shown in FIG. 6. Each of the pistons such as the movable second piston 162 includes a pair of O-ring seals 166 between the piston and its respective bore, such as 154.

Each of the pistons 160, 162 and 164 includes a convex face 168 so that it provides substantially a point support against rearward facing planar surface 170 of face plate 106.

The fixed piston 160 can be described as a fixed length support 160 extending between the face plate 106 and the main compensating head 116.

As is further described below, the movable second and third pistons 162 and 164 are communicated with the first and second hydraulic pumps 102 and 104, respectively, so that the movable pistons 162 and 164 may be extended or retracted from their respective bores so that in combination with the fixed support piston 160, an adjustable three-point support mechanism is provided between the face plate 106 and the main compensating head 116. It will be appreciated that by adjustment of the extension of the movable second and third pistons 162 and 164, the alignment of the brake lathe body relative to the wheel hub and thus relative to the brake disc rotor can be adjusted so that the brake lathe will cut the brake disc rotor in the desired manner substantially perpendicular to the axis of rotation of the brake disc rotor.

First and second hydraulic pathways 172 and 174 are defined through the coupling head assembly 108 to communicate the first and second hydraulic pumps 102 and 104 with the movable second and third pistons 162 and 164, respectively.

The pathways 172 and 174 must cross the rotating interface between compensator stub shaft 114 and bore 112 of main coupling head 110. First and second O-ring seals 176 and 178 seal this interface on either side of first pathway 172. Third and fourth O-ring seals 180 and 182 seal this interface on either side of second fluid pathway 174.

Referring now to FIG. 4, the first manually operated hydraulic pump 102 includes a pressure adjusting block 184 threadedly received within a bore 186 defined in the main coupling body 110. A threaded adjusting plunger 188 includes a smooth plunger portion 190 closely received through a bore 192 of block 184 with an O-ring seal 194 provided therebetween. A threaded upper portion 196 of plunger 188 is received in a threaded bore 198 of block 184. A plunger adjusting knob 200 is attached to plunger 188 with a set screw 202.

A free end 204 of plunger 188 is received within a reduced diameter transverse bore 206. The bore 206 intersects another transverse bore 208 located at a right angle thereto. The bore 208 is closed by a calibrating plunger 210 which includes a threaded end portion 212 received in a threaded portion 214 of make-up reservoir bore 208.

Thus, the bores 206 and 208 define a hydraulic chamber within the main coupling head 110, with the volume of hydraulic fluid contained in the chamber 206, 208 being defined by the length by which the plunger 188 extends into the bore 172 and by the position of calibrating plunger 210. The chamber 206, 208 is communicated with and defines a portion of the first hydraulic pathway 172.

Thus, when it is desired to extend the movable second hydraulic piston 162, the knob 200 is grasped by a human operator and rotated clockwise to move the plunger 188 into chamber 206, 208 thus forcing hydraulic fluid through the pathway 172 into the second bore 154 of main compensating head 116 forcing the piston 162 to move outward against the face plate 106, thus changing the alignment between face plate 106 and main compensating head 116.

The second hydraulic pump 104 operates in a similar manner to force hydraulic fluid through second pathway 174. The two hydraulic pumps 102 and 104 are independently operated so that the movable pistons 162 and 164 can be adjusted independently of each other.

The main coupling head 110 can be described as a fixable portion 110 of the coupling head assembly 108, and the compensator stub shaft 114 and main compensating head 116 may be described as a rotatable portion of the coupling head assembly 108. The hydraulic pumps 102 and 104 are thus mounted on the fixable portion of the coupling head assembly, and the hydraulic pistons 162 and 164 are mounted on the rotatable portion of the coupling head assembly. The first and second fluid pathways 172 and 174, which may also be referred to as first and second fluid conduits 172 and 174, are defined through the coupling head assembly 108 from the first and second pumps 102 and 104 to the movable pistons 162 and 164, respectively. The fluid seals 176, 178, 180 and 182 can be described as rotating fluid seals associated with the first and second fluid pathways 172 and 174, the seals being located between the fixable portion and the rotatable portion of the coupling head assembly 108. Thus, while the wheel hub and adapter and brake disc rotor are all being rotatably driven by the brake lathe and are rotating with the rotatable portions of the coupling head assembly 100, the first and second pumps 102 and 104 may remain fixed so that they can be manually operated to allow alignment adjustment on-the-fly while the wheel hub and brake disc rotor are being rotated.

Figure 2:
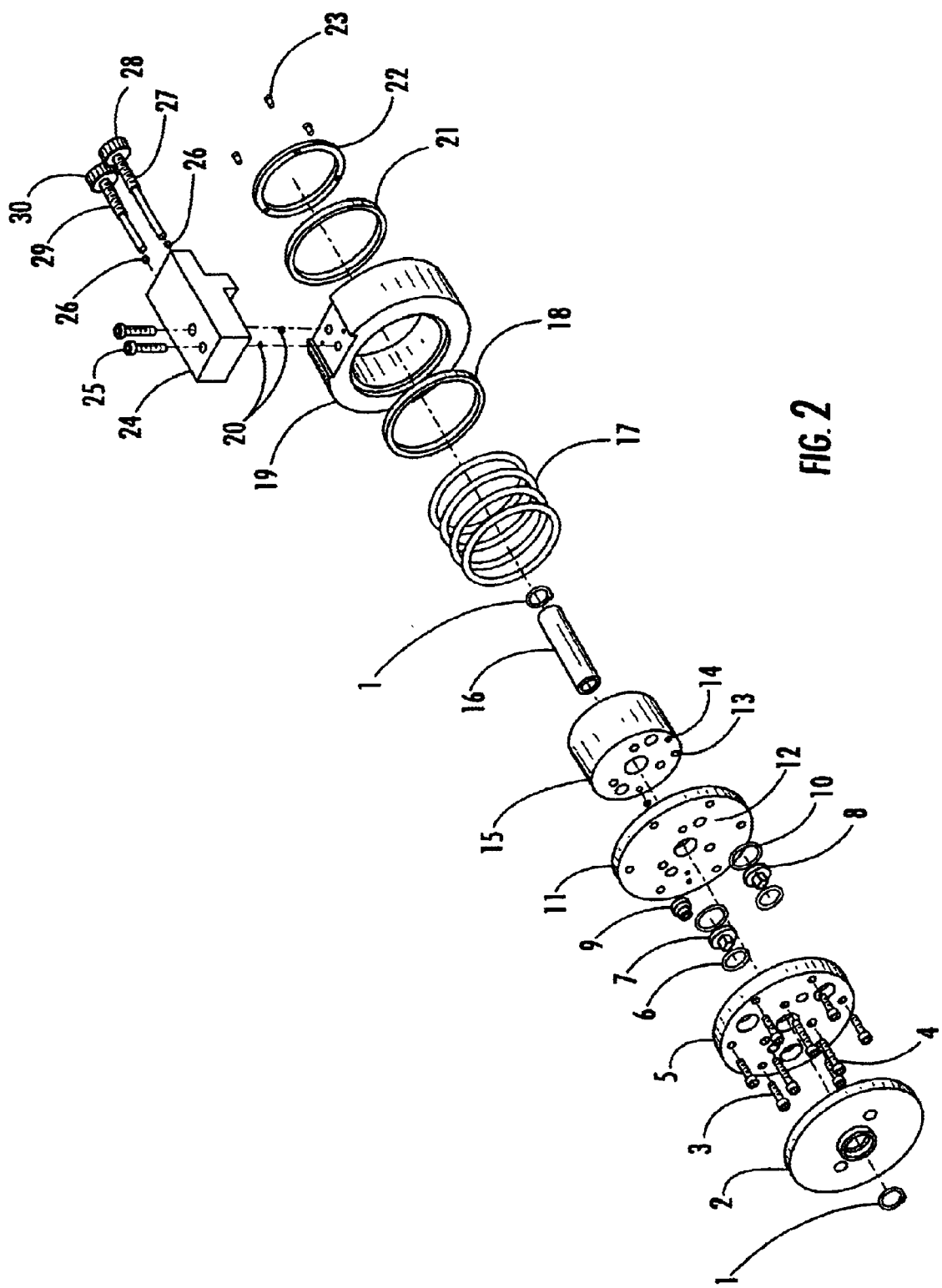
FIG. 2 is an exploded view of the apparatus of FIG. 1.

While the fixed portion of the coupling head assembly 100 could be maintained permanently fixed like the embodiment of FIGS. 1 and 2, it has been determined that it is advantageous to utilize the alternative embodiment of FIGS. 3–8, wherein the hydraulic pumps are oriented transverse to the axis of rotation, thus allowing the main coupling head 110 to be released after the alignment adjustment has been made, so that the main coupling head 110 and the pumps 102 and 104 subsequently are allowed to rotate with the wheel hub after the alignment has been adjusted and during the process of actually cutting the brake disc rotor.

The purpose for this modification is to reduce the duration of the relative rotational motion across the interface between compensator stub shaft 114 and the bore 112 of main coupling body 110. This in turn reduces the wear on O-ring seals 176, 178, 180 and 182, and perhaps more importantly greatly reduces the volume of hydraulic fluid which will be lost across those seals during a typical brake rotor cutting job. It will be appreciated that due to the nature of a rotating hydraulic seal, some very small amount of fluid will be lost there across especially when there is relative rotational motion associated with the seal. Initially, the loss can be made up by adjustment of the position of the calibrating piston 210 within the make-up reservoir bore 208. This is accomplished by moving the plunger 188 to its most retracted position, then advancing calibration piston 210 until the pistons 162 and 164 move faceplate 106 out until it is aligned with the outer face 117 of main compensating head 116. After a number of jobs, it will be necessary to add hydraulic fluid to the fluid pathways 172 and 174. By minimizing the rotational motion to which seals 176, 178, 180 and 182 are subjected, this fluid loss is greatly reduced, and the number of brake rotor cutting jobs which can be performed by the apparatus without replacing lost fluid is increased very substantially.

A locking pin 220, shown in FIG. 9, provides a means for locking the fixable portion 110, and for subsequently releasing the same. Pin 220 slides in tube 222. Pin 220 has a distal end 224 which can be received in a bore (not shown) in the back side of main coupling head 110. During the "on-the-fly" alignment adjustment, the pin 220 is engaged with the main coupling head 110 to hold the same fixed. After the adjustment is completed the lathe is stopped and pin 220 is retracted to the position shown in FIG. 9, releasing the main coupling head 110. The lathe is then turned back on to cut the brake rotor 105, and main coupling head 110 is allowed to rotate with the brake rotor 105 during the cutting operation.

It will be appreciated that with the apparatus of the present invention, the relative alignment of the brake lathe to the wheel hub can be adjusted very quickly by simply turning the knobs of the first and second hydraulic pumps 102 and 104. That adjustment can be made independent of the rotational speed of the wheel hub. This is contrasted to some prior art systems such as that of Newell et al., U.S. Pat. No. 5,974,878 where only an incremental adjustment can be made with each rotation of the brake rotor. Thus, the present system can be adjusted much more rapidly than can a system like that of Newell et al.

Since the hydraulic adjustment system of the present invention is designed for manual operation, it can be utilized by a human operator in response to any suitable sensor system for sensing misalignment between the brake lathe and the wheel hub. Many different sensor systems are known in the prior art, and the sensor system itself is not a component of the present invention.

It should further be apparent that certain aspects of the present invention could be utilized with a fully automated system wherein the manually adjustable hydraulic pumps 102 and 104 are modified and connected to an automatic feedback system with an appropriate sensor system wherein fully automatic alignment adjustment is provided utilizing the hydraulically driven three-point piston support arrangement of the present invention.

Thus, it is seen that the methods and apparatus of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A brake lathe alignment apparatus for mounting a brake lathe upon an adapter attached to a wheel hub, comprising:

a face plate adapted to engage the adapter for defining an alignment of the wheel hub and the adapter;

a brake lathe body;

a coupling head assembly mounted upon the brake lathe body for defining an alignment of the brake lathe body, the coupling head assembly including a fixable portion and a rotatable portion;

an adjustable three-point support system between the face plate and the coupling head assembly, at least two of the three points being adjustable, so that the alignment of the brake lathe body relative to the wheel hub and the adapter can be adjusted;

first and second hydraulic pistons carried by the coupling head assembly and being adjustable independently of each other, the pistons extending from the coupling head assembly into engagement with the face plate, the pistons defining the two adjustable points of the three-point support system, the hydraulic pistons being mounted on the rotatable portion of the coupling head assembly;

first and second hydraulic pumps for supplying hydraulic fluid to the two hydraulic pistons to adjust the pistons and thus adjust the alignment of the brake lathe body relative to the wheel hub and the adapter, the hydraulic pumps being mounted on the fixable portion of the coupling head assembly;

wherein the coupling head assembly has first and second fluid conduits defined therethrough from the first and second pumps to the first and second pistons, respectively; and the coupling head assembly includes rotating fluid seals between the fixable portion and the rotatable portion, the seals being associated with the first and second conduits, so that the alignment of the brake lathe body relative to the wheel hub and adapter can be manually adjusted by operating the hydraulic pumps while the brake lathe is rotating the wheel hub and the adapter.

2. The apparatus of claim 1, further comprising:

means for allowing the fixable portion to rotate with the rotatable portion of the coupling head assembly after the alignment has been adjusted, so that seal wear and hydraulic fluid loss are minimized during lathe operation.

3. A brake lathe alignment apparatus for mounting a brake lathe upon an adapter attached to a wheel hub, comprising:

a face plate adapted to engage the adapter for defining an alignment of the wheel hub and the adapter;

a brake lathe body;

a coupling head assembly mounted upon the brake lathe body for defining an alignment of the brake lathe body;

an adjustable three-point support system between the face plate and the coupling head assembly, at least two of the three points being adjustable, so that the alignment of the brake lathe body relative to the wheel hub and the adapter can be adjusted;

first and second hydraulic pistons carried by the coupling head assembly and being adjustable independently of each other, the pistons extending from the coupling head assembly into engagement with the face plate, the pistons defining the two adjustable points of the three-point support system;

first and second hydraulic pumps for supplying hydraulic fluid to the two hydraulic pistons to adjust the pistons and thus adjust the alignment of the brake lathe body relative to the wheel hub and the adapter, each of the hydraulic pumps includes including a threaded plunger and a knob attached to the plunger, so that the knob can be manually rotated to move the plunger.

4. The apparatus of claim 3, wherein:

each of the hydraulic pistons includes a convex curved outer end engaging the face plate.

5. A wheel hub mounted brake lathe alignment apparatus, comprising:

a first structure adapted to be attached to the wheel hub;

a second structure adapted to be attached to the brake lathe;

a fixed length support extending between the first and second structures;

a plurality of hydraulic pistons carried by the second structure and engaging the first structure, so that alignment of the second structure relative to the first structure is adjustable by extending and retracting the hydraulic pistons, wherein the plurality of hydraulic pistons includes two and only two hydraulic pistons which with the fixed length support define an adjustable three-point support system;

first and second adjustable hydraulic fluid pressure sources independently communicated with the two pistons, for independently adjusting a position of each of the two pistons, each of the pressure sources includes a threaded plunger pump operable by rotation of a plunger to advance and retract the plunger.

6. The apparatus of claim 5, wherein:

the plunger pumps each have a plunger axis which lies generally perpendicular to an axis of rotation of the first structure.

* * * * *